(12) United States Patent
Kim et al.

(10) Patent No.: US 10,249,875 B2
(45) Date of Patent: Apr. 2, 2019

(54) METHOD OF FABRICATING ANODE ACTIVE MATERIAL FOR LITHIUM SECONDARY BATTERY, ANODE ACTIVE MATERIAL FABRICATED THEREBY, AND SLURRY FOR ANODE

(71) Applicant: LG Chem, Ltd., Seoul (KR)

(72) Inventors: Ye Ri Kim, Daejeon (KR); Byung Hun Oh, Daejeon (KR); Eun Kyung Kim, Daejeon (KR)

(73) Assignee: LG Chem, Ltd. (KR)

(*) Notice: Subject to any disclaimer, the term of this patent is extended or adjusted under 35 U.S.C. 154(b) by 202 days.

(21) Appl. No.: 15/176,499

(22) Filed: Jun. 8, 2016

(65) Prior Publication Data

US 2016/0365574 A1 Dec. 15, 2016

(30) Foreign Application Priority Data

Jun. 9, 2015 (KR) .................. 10-2015-0081452

(51) Int. Cl.
| | |
|---|---|
| *H01M 4/48* | (2010.01) |
| *C01G 23/00* | (2006.01) |
| *H01M 4/485* | (2010.01) |
| *H01M 4/62* | (2006.01) |
| *H01M 4/04* | (2006.01) |
| *H01M 10/052* | (2010.01) |

(52) U.S. Cl.
CPC .......... *H01M 4/485* (2013.01); *C01G 23/005* (2013.01); *H01M 4/622* (2013.01); *H01M 4/624* (2013.01); *H01M 4/0404* (2013.01); *H01M 4/623* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 8,052,955 B2* | 11/2011 | Gorshkov | ............ | C01G 23/005 423/598 |
| 9,640,793 B2* | 5/2017 | Holme | .................... | H01M 4/04 |
| 9,899,680 B2* | 2/2018 | Tsuji | ................. | H01M 10/0525 |

(Continued)

FOREIGN PATENT DOCUMENTS

JP 2011113796 A 6/2011

*Primary Examiner* — Scott J. Chmielecki
(74) *Attorney, Agent, or Firm* — Lerner, David, Littenberg, Krumholz & Mentlik, LLP

(57) ABSTRACT

A method of preparing a negative electrode active material of the present invention includes mixing a lithium precursor and a titanium precursor, and sintering the precursor mixture to prepare a lithium titanium-based active material including a lithium titanium oxide, wherein a residual amount of lithium in the lithium titanium-based active material is 2,000 ppm or less based on a total amount of the lithium titanium-based active material. The preparation method allows the residual amount of lithium to be 2,000 ppm or less in a range, in which rate capability is not significantly reduced, by appropriately controlling sintering temperature, wherein the method may provide a lithium secondary battery, in which an amount of gas generated is extremely small even if stored at high temperature, a thickness expansion rate is consequently considerably low, and, simultaneously, the rate capability is also excellent.

16 Claims, 5 Drawing Sheets

(56) References Cited

U.S. PATENT DOCUMENTS

| | | | |
|---|---|---|---|
| 2008/0113264 A1* | 5/2008 | Inagaki | H01M 4/485 429/156 |
| 2010/0015514 A1* | 1/2010 | Miyagi | H01M 4/131 429/129 |
| 2010/0112350 A1* | 5/2010 | Tanimizu | C01G 23/005 428/401 |
| 2011/0003212 A1* | 1/2011 | Sato | H01M 10/0585 429/322 |
| 2012/0107680 A1* | 5/2012 | Amiruddin | H01M 4/386 429/206 |
| 2012/0153225 A1* | 6/2012 | Ko | C01G 23/005 252/301.4 P |
| 2012/0273716 A1* | 11/2012 | Li | H01M 4/02 252/182.1 |
| 2012/0319034 A1 | 12/2012 | Awano et al. | |
| 2013/0004851 A1* | 1/2013 | Lee | C01G 23/005 429/231.1 |
| 2013/0045424 A1* | 2/2013 | Sugiura | C01G 45/1228 429/231.8 |
| 2013/0122376 A1* | 5/2013 | Yokoyama | H01M 10/0562 429/305 |
| 2013/0161558 A1* | 6/2013 | Kawamura | H01M 4/485 252/182.1 |
| 2013/0189582 A1* | 7/2013 | Lee | H01M 4/485 429/225 |
| 2013/0295439 A1* | 11/2013 | Masarapu | H01B 1/24 429/163 |
| 2014/0017566 A1* | 1/2014 | Yanagihara | H01M 4/366 429/220 |
| 2014/0080003 A1* | 3/2014 | Tsuji | H01M 10/0525 429/231.1 |
| 2014/0170493 A1* | 6/2014 | Holme | H01M 4/04 429/220 |
| 2014/0363367 A1* | 12/2014 | Kim | C01D 15/02 423/598 |
| 2015/0380722 A1* | 12/2015 | Blangero | H01M 4/525 429/231.3 |
| 2017/0179484 A1* | 6/2017 | Park | H01M 10/0569 |
| 2017/0222211 A1* | 8/2017 | Ryu | H01M 4/131 |
| 2017/0250405 A1* | 8/2017 | Esaki | H01M 4/485 |
| 2017/0288211 A1* | 10/2017 | Zhamu | H01M 4/366 |
| 2017/0358796 A1* | 12/2017 | Kim | H01M 4/525 |

* cited by examiner

METHOD OF FABRICATING ANODE ACTIVE MATERIAL FOR LITHIUM SECONDARY BATTERY, ANODE ACTIVE MATERIAL FABRICATED THEREBY, AND SLURRY FOR ANODE

CROSS-REFERENCE TO RELATED APPLICATIONS

This application claims the benefit of Korean Patent Application No. 10-2015-0081452, filed on Jun. 9, 2015, in the Korean Intellectual Property Office, the disclosure of which is incorporated herein in its entirety by reference.

TECHNICAL FIELD

The present invention relates to a method of preparing a negative electrode active material as a lithium titanium-based active material, a negative electrode active material prepared by the method, and a negative electrode slurry and a lithium secondary battery including the negative electrode active material, and more particularly, to a method of preparing a negative electrode active material in which a residual amount of lithium in the negative electrode active material is 2,000 ppm or less.

BACKGROUND ART

Demand for secondary batteries, such as Ni-MH secondary batteries or lithium secondary batteries, has been increased as development of portable devices, such as mobile phones, notebook computers, and camcorders, has increased. In particular, since lithium secondary batteries using lithium and non-aqueous electrolyte solution are more likely to be realized as compact, lightweight, and high energy density batteries, development of the lithium secondary batteries has been actively conducted. In general, transition metal oxides, such as $LiCoO_2$, $LiNiO_2$, and $LiMn_2O_4$, are used as a positive electrode material of a lithium secondary battery, lithium metal or carbon is used as a negative electrode material, and an organic solvent containing lithium ions is used as an electrolyte between two electrodes to constitute a lithium secondary battery.

However, with respect to a lithium secondary battery using the lithium metal as a negative electrode, since dendrites may be easily generated when charge and discharge are repeated and, as a result, the lithium secondary battery may have high risk of short circuits, a lithium secondary battery has been commercialized in which a carbonized or graphitized carbon material is used in the negative electrode and a non-aqueous solvent containing lithium ions is used as an electrolyte. However, since a carbon-based negative electrode material has large irreversible capacity, its initial charge and discharge efficiency may be low and capacity may be reduced. In addition, since lithium may be precipitated on the surface of carbon during overcharging, it may cause problems in safety.

A lithium titanium oxide, which is recently in the spotlight as a negative electrode material of a lithium ion battery, may have limitations in that an operating voltage is high at 1.3 V to 1.6 V in comparison to a typical carbon-based negative electrode material and irreversible capacity is low at about 170 mAh/g, but may achieve excellent safety, because high-speed charge and discharge is possible, an irreversible reaction almost does not occur (initial efficiency of 95% or more), and the heat of reaction is very low. Also, with respect to the carbon material, theoretical density is low at about 2 g/cm³, but, since $Li_4Ti_5O_{12}$, as one type of the lithium titanium oxides, has a high theoretical density of about 3.5 g/cm³, capacity per volume is similar to that of the carbon material.

When an electrode is realized by actually using the lithium titanium oxide as an active material, it is an important task to increase the capacity per volume by increasing the density of the electrode while maintaining rate capability as high as possible in the synthesis of the lithium titanium oxide.

Also, with respect to a lithium secondary battery using the lithium titanium oxide as a negative electrode, there is a limitation in that gas is generated by lithium remained in the lithium titanium oxide when stored for a long period of time at high temperature. When the gas is generated in the battery, there is a risk of causing a serious problem in safety, for example, explosion due to the expansion of the battery, and thus, there is a need to develop a lithium titanium oxide-based negative electrode material in which the expansion of the battery does not occur due to a small amount of the generated gas while maintaining high rate capability.

DISCLOSURE OF THE INVENTION

Technical Problem

An aspect of the present invention provides a negative electrode active material, in which a thickness expansion rate is significantly reduced by reducing a residual amount of lithium in a range, in which discharge capacity and rate capability are not significantly reduced, and reducing the consequent amount of generated gas by controlling sintering temperature and time and appropriately controlling a molar ratio of lithium to titanium in lithium titanium oxide when the negative electrode active material, as a lithium titanium-based active material, is prepared to allow the residual amount of lithium in the negative electrode active material to be 2,000 ppm or less, and a negative electrode slurry and a lithium secondary battery including the negative electrode active material.

Technical Solution

According to an aspect of the present invention, there is provided a method of preparing a negative electrode active material including mixing a lithium precursor and a titanium precursor; and sintering the precursor mixture to prepare a lithium titanium-based active material including a lithium titanium oxide, wherein a residual amount of lithium in the lithium titanium-based active material is 2,000 ppm or less based on a total amount of the lithium titanium-based active material.

The sintering may be performed in a temperature range of 770° C. to 850° C.

According to another aspect of the present invention, there is provided a negative electrode slurry for a lithium secondary battery including a lithium titanium-based active material including a lithium titanium oxide; a conductive agent; and a binder, wherein a residual amount of lithium in the lithium titanium oxide is 2,000 ppm or less based on a total amount of the lithium titanium oxide.

The negative electrode slurry may include 84 wt % to 92 wt % of the lithium titanium-based active material, 2 wt % to 6 wt % of the conductive agent, and 2 wt % to 10 wt % of the binder.

The residual amount of lithium may be an amount of a lithium salt in addition to the lithium titanium oxide present in the lithium titanium-based active material.

Advantageous Effects

A method of preparing a negative electrode active material of the present invention allows a residual amount of lithium in a lithium titanium-based active material to be 2,000 ppm or less in a range, in which discharge capacity and rate capability are not significantly reduced, by appropriately controlling sintering temperature and a molar ratio of lithium to titanium, wherein the method may provide a lithium secondary battery, in which an amount of gas generated is extremely small even if stored at high temperature, a thickness expansion rate is consequently considerably low, and, simultaneously, the rate capability is also excellent, by including the lithium titanium-based active material having a residual amount of lithium of 2,000 ppm or less.

MODE FOR CARRYING OUT THE INVENTION

Figure 1:
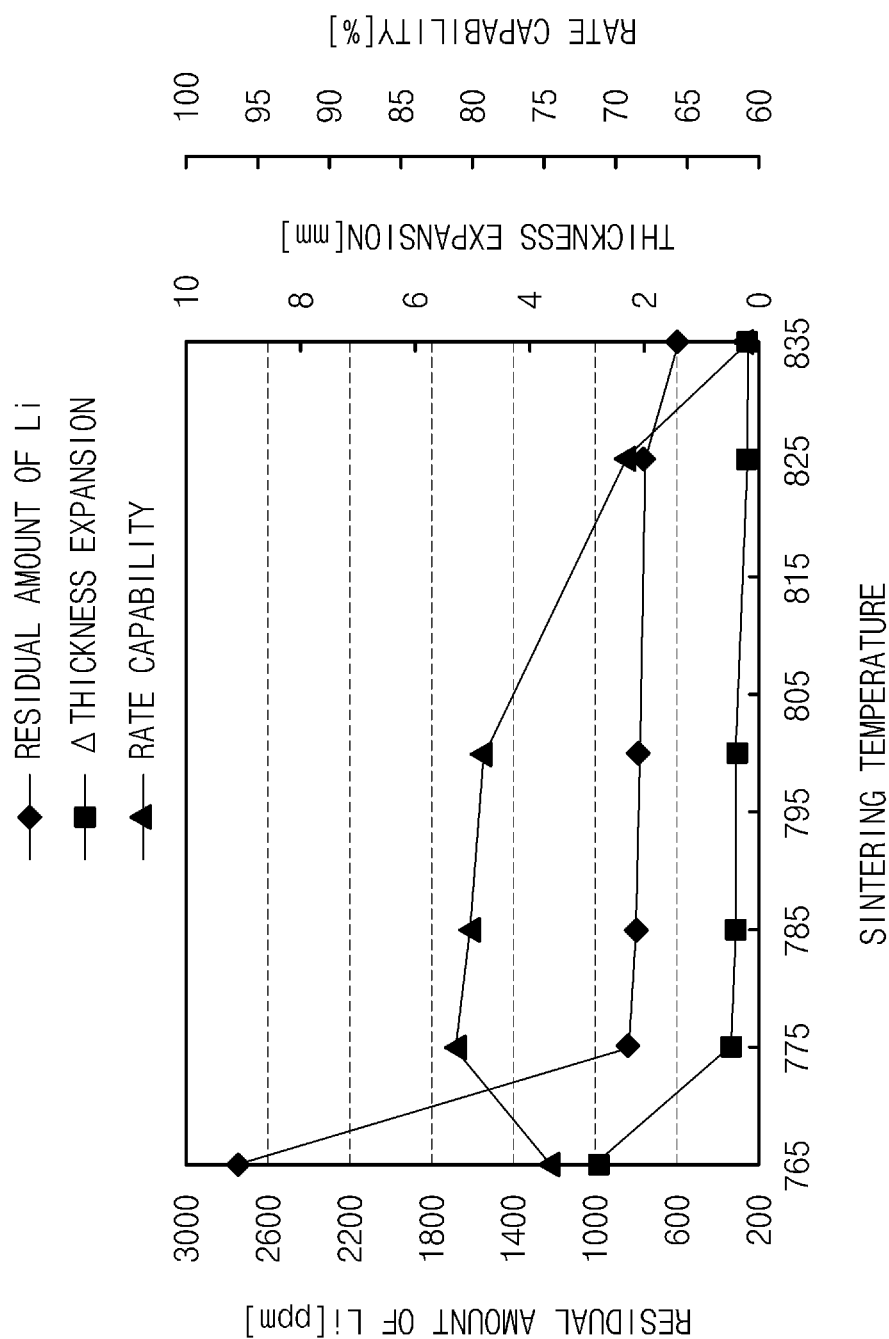
FIG. 1 is a graph illustrating the results in which a residual amount of lithium, thickness variation during high-temperature storage, and rate capability of a lithium secondary battery prepared according to an embodiment of the present invention are evaluated according to sintering temperature.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a negative electrode active material of the present invention includes mixing a lithium precursor and a titanium precursor, and sintering the precursor mixture to prepare a lithium titanium-based active material including a lithium titanium oxide.

The mixing is a process which allows the lithium precursor and the titanium precursor to be overall uniformly mixed, wherein a mixing method is not particularly limited as long as the precursor mixture in a dried state is uniformly mixed, and the mixing method may include a wet mixing method and a dry mixing method.

The wet mixing method may be used for the mixing, and a wet mixing method using a spray drying process, for example, may include a process of adding a lithium precursor and a titanium precursor to a volatile solvent to prepare a precursor solution, and preparing precursor mixed powder by injecting the precursor solution into a chamber of a spray dryer to evaporate the volatile solvent.

Specifically, a method of adding the titanium precursor, while stirring the solution in which the lithium precursor is dissolved in the volatile solvent, may be used for the preparation of the precursor solution, water, such as deionized water or distilled water, low-carbon alcohol, such as methanol, ethanol, or propanol, or acetone may be used as the volatile solvent used in this case, and the volatile solvent is not particularly limited as long as it is a solvent which may be easily evaporated by heat applied during the spray drying.

The precursor solution thus prepared may be injected into the chamber of the spray dryer as described above, and drying may be simultaneously performed while the precursor solution is sprayed by the spray dryer.

For example, an ultrasonic spray dryer, an air nozzle spray dryer, an ultrasonic nozzle spray dryer, a filter expansion aerosol generator, an electrostatic spray dryer, or a combination thereof may be used as the spray dryer. A temperature in the chamber during the spray drying may be in a range of 20° C. to 300° C., and, since agglomeration of particles of the precursor mixed powder or particle growth may occur when the temperature is greater than 300° C., control of appropriate temperature may be required.

The dry mixing method may be used for the mixing, wherein the dry mixing method may mix the lithium precursor and the titanium precursor by a mechanical method, and, for example, a ball mill, a high-speed rotary grinder, a stirring mill, a jet mill, or a combination thereof may be used in the mixing method.

In the mixing, the lithium precursor and the titanium precursor may be mixed in a predetermined ratio, and a residual amount of lithium and rate capability may be controlled by the adjustment of the ratio. With respect to amounts of the precursors subjected to the mixing, the lithium precursor may be included in an amount of 25 wt % to 45 wt, and the titanium precursor may be included in an amount of 55 wt % to 75 wt.

When the amount of the lithium precursor included is less than 25 wt %, rate capability of a battery may be reduced, and, when the amount of the lithium precursor included is greater than 45 wt %, the residual amount of lithium in the active material may be increased. When the amount of the titanium precursor included is less than 55 wt %, since the unreacted lithium precursor may remain according to a reaction rate with respect to lithium, the residual amount of lithium may be increased, and, when the amount of the titanium precursor included is greater than 75 wt %, the unreacted titanium precursor may remain to adversely affect the performance of the active material.

The lithium precursor may be used without particular limitation as long as it is a source material capable of providing lithium such as a lithium salt in which lithium ions and a salt are combined, and, for example, $Li_2CO_3$, LiOH, LiF, $Li_2SO_4$, $LiNO_3$, LiCl, or a mixture thereof may be used.

Also, the titanium precursor may be used without particular limitation as long as it is a source material capable of providing titanium such as a titanium oxide, may be in a hydrate form, and may also be dry powder. However, when the titanium precursor is a hydrate, the titanium precursor may be mixed with the lithium precursor by using the wet mixing method, and when the titanium precursor is dry powder, the dry mixing method may be used. As the titanium precursor, for example, $TiO_2$, $TiCl_4$, $TiOCl_2$, $TiOSO_4$, $TiO(OH)_2$, or a mixture thereof may be used.

The sintering may be a process of forming a lithium titanium oxide phase by heat treating the precursor mixed powder, which is in a state of being mixed and dried by any method, and preparing a lithium titanium-based active material including the lithium titanium oxide.

In this case, it may be necessary to appropriately control a sintering temperature or sintering time so as to form the lithium titanium oxide phase, it may be necessary to avoid the unreacted lithium precursor or titanium precursor to remain as much as possible in terms of performance and safety of the battery, and it may be necessary to control conditions of the sintering so that a by-product, such as a lithium salt, generated due to a side reaction is absent if possible.

The sintering may be performed in a temperature range of about 770° C. to 850° C., and, for example, may be performed in a temperature range of about 770° C. to 835° C., or 775° C. to 835° C., or 770° C. to 800° C., or 775° C. to 800° C. In a case in which sufficient heat is not supplied because the sintering temperature is less than 770° C., a lithium salt, such as the unreacted lithium precursor or a lithium compound due to the side reaction, may remain in the lithium titanium-based active material, and, in a case in which a large amount of lithium is remained in the lithium titanium-based active material, since a large amount of gas may be generated due to the remaining lithium when a final battery product is stored at high temperature, the battery may expand.

The residual amount of lithium may be continuously reduced as the sintering temperature is increased, but, since particle growth of the lithium titanium oxide may occur when the sintering temperature is greater than 850° C. and, as a result, particle size may increase to eventually significantly reduce the rate capability, the appropriate control of the sintering temperature is necessary.

Also, if the sintering is performed in a temperature range of about 770° C. to about 800° C., a lithium titanium-based active material, i.e., a negative electrode active material, which may improve both the residual amount of lithium and the rate capability of the battery, may be prepared, but the sintering temperature is not limited to the above range.

The control of the sintering time is also required for the sintering, wherein, in the present invention, the sintering may be performed for about 2 hours to about 12 hours. When the sintering is performed for less than 2 hours, the limitations similar to those of the case, in which the sintering is performed at a low sintering temperature, may occur, and, when the sintering time is greater than 12 hours, energy or process costs may be unnecessarily consumed.

The lithium titanium-based active material prepared by the above-described sintering may include the lithium titanium oxide and, in addition, may also include by-products, i.e., a lithium salt, such as the unreacted lithium precursor or a lithium compound due to the side reaction, or a titanium compound. However, when the sintering temperature and the sintering time are properly controlled, the lithium titanium oxide phase may be sufficiently formed, and if the lithium titanium oxide phase is sufficiently formed, a lithium titanium oxide with a chemical formula of $Li_4Ti_5O_{12}$ may be prepared and the other by-products may be almost absent, but the present invention is not limited thereto.

In the lithium titanium oxide included in the lithium titanium-based active material, a molar ratio of lithium to titanium may be in a range of 0.79 to 0.86, particularly 0.80 to 0.85, and more particularly 0.81 to 0.85.

In a case in which the molar ratio of lithium to titanium is less than 0.79 or greater than 0.86, a lithium salt, such as the unreacted lithium precursor or the lithium compound due to the side reaction, and/or a titanium salt, such as the titanium precursor, may remain in the lithium titanium-based active material, and, in a case in which a large amount of lithium and other by-products is remained in the lithium titanium-based active material, since a large amount of gas may be generated due to the remaining material when the final battery product is stored at high temperature, the battery may expand.

Also, in a case in which the molar ratio is outside the above range, since there is a high possibility of forming other phases in addition to the lithium titanium oxide phase, and, as a result, the discharge capacity may be significantly reduced, it is necessary to appropriately control the molar ratio of lithium to titanium.

When the lithium titanium oxide phase is sufficiently formed by appropriately controlling the sintering temperature and the molar ratio of lithium to titanium in the lithium titanium oxide, the residual amount of lithium in the lithium titanium-based active material may be 2,000 ppm or less based on a total amount of the lithium titanium-based active material. The expression "residual amount of lithium" herein may denote an amount of a lithium salt, such as a lithium precursor or a lithium compound, among the lithium salt, such as the unreacted lithium precursor or the lithium compound due to the side reaction, or the titanium compound.

In general, since issues directly related to safety may occur, for example, a large amount of gas is generated during the storage of the subsequent battery product at high temperature when the residual amount of lithium in the active material is large, it is necessary to reduce the lithium remaining in the active material as much as possible. Since the residual amount of lithium in the active material prepared according to the method of preparing a negative electrode active material, according to the embodiment of the present invention, may be 2,000 rpm or less, safety may be secured because the expansion of the battery product using the negative electrode active material is almost absent even if stored at high temperature, and, simultaneously, there is a possibility of providing a lithium secondary battery having excellent rate capability.

A negative electrode slurry for a lithium secondary battery according to another embodiment of the present invention includes a lithium titanium-based active material including a lithium titanium oxide; a conductive agent; and a binder, wherein a residual amount of lithium in the lithium titanium oxide is 2,000 ppm or less based on a total amount of the lithium titanium oxide.

The lithium titanium-based active material may be a material prepared by the method of preparing a negative electrode active material according to the embodiment of the present invention or may be a material prepared by other methods, but it may mean that the residual amount of lithium in the lithium titanium-based active material is 2,000 ppm or less.

Since descriptions of the lithium titanium-based active material and the residual amount of lithium overlap with those described above, the descriptions thereof will be omitted.

The negative electrode slurry for a lithium secondary battery may be a slurry, in which the lithium titanium-based active material, the conductive agent, and the binder are mixed, and an amount of the lithium titanium-based active material may be in a range of 84 wt % to 92 wt %, an amount of the conductive agent may be in a range of 2 wt % to 6 wt %, and an amount of the binder may be in a range of 2 wt % to 10 wt % based on a total amount of the negative electrode slurry.

The conductive agent may be used without limitation as long as it is typically used in the art, and, for example, artificial graphite, natural graphite, carbon black, acetylene black, Ketjen black, Denka black, thermal black, channel black, carbon fibers, metal fibers, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, or a mixture thereof may be used.

The binder may be used without limitation as long as it is typically used in the art, and, for example, polyvinylidene fluoride (PVdF), a polyvinylidene fluoride-polyhexafluoropropylene copolymer (PVdF/HFP), poly(vinyl acetate), polyvinyl alcohol, polyethylene oxide, polyvinylpyrrolidone, polyvinylpyridine, alkylated polyethylene oxide, polyvinyl ether, poly(methyl methacrylate), poly(ethyl acrylate), polytetrafluoroethylene (PTFE), polyvinyl chloride, polyacrylonitrile, a styrene-butadiene rubber, an acrylonitrile-butadiene rubber, a fluoro rubber, an ethylene-propylene-diene monomer (EPDM), a sulfonated ethylene-propylene-diene monomer, carboxymethyl cellulose (CMC), regenerated cellulose, starch, hydroxypropyl cellulose, tetrafluoroethylene, or a mixture thereof may be used.

A diameter of particles of the lithium titanium-based active material may be in a range of 0.1 μm to 100 μm. That is, when the sintering temperature is properly controlled during the preparation of the above-described negative electrode active material, the lithium titanium-based active material particles having a particle diameter within the above range may be prepared, wherein, if the diameter of the particles is small, it may evidence that the sintering temperature is low or the sintering time is short, and, if the diameter of the particles is large, it may evidence that the sintering temperature is excessively increased or the sintering time is excessively long. Thus, when the sintering temperature and the sintering time are properly controlled and accordingly, when a value of the residual amount of lithium obtained is equal to or less than the amount intended in the present invention, lithium titanium-based active material particles having a particle diameter within the above range may be obtained.

A negative electrode for a lithium secondary battery according to another embodiment of the present invention includes a negative electrode collector; and the above-described negative electrode slurry for a lithium secondary battery coated on the negative electrode collector. In the negative electrode for a lithium secondary battery prepared from the negative electrode slurry including the negative electrode active material, as the lithium titanium-based active material, according to the embodiment of the present invention, the residual amount of lithium may be small as described above.

Also, since a lithium secondary battery according to another embodiment of the present invention includes the negative electrode for a lithium secondary battery; a positive electrode; an electrolyte solution; and a separator and has the negative electrode with a small residual amount of lithium, the expansion of the electrode almost does not occur even if the battery is stored at high temperature and rate capability may be excellent.

A battery module according to another embodiment of the present invention includes the above-described lithium secondary battery as a unit cell, and a battery pack according to another embodiment of the present invention includes the battery module.

Any battery case typically used in the art may be selected as a battery case used in the present invention. A shape of the lithium secondary battery according to the use thereof is not limited, and for example, a cylindrical type using a can, a prismatic type, a pouch type, or a coin type may be used.

The lithium secondary battery according to the present invention may not only be used in a battery module that is used as a power source of a small device, but may also be used as a unit cell in a medium and large sized battery pack including a plurality of batteries. Preferred examples of the medium and large sized device may be an electric vehicle, a hybrid electric vehicle, a plug-in hybrid electric vehicle, or a power storage system, but the medium and large sized device is not limited thereto.

EXAMPLES

Hereinafter, exemplary embodiments of the present invention will be described in detail with reference to the accompanying drawings to fully explain the present invention in such a manner that it may easily be carried out by a person with ordinary skill in the art to which the present invention pertains. The present invention may, however, be embodied in many different forms and should not be construed as being limited to the embodiments set forth herein.

Example 1

1) Preparation of Negative Electrode 190 g of LiOH.H$_2$O, as a lithium precursor, and 400 g of TiO$_2$, as a titanium precursor, were introduced into a ball mill and uniformly mixed by milling for 60 minutes to prepare precursor mixed powder. Next, the precursor mixed powder was loaded into a furnace and sintered at a temperature of 775° C. for about 6 hours, and a lithium titanium oxide (Li$_4$Ti$_5$O$_{12}$) was synthesized by performing a process in which particles having a diameter of 50 μm or more were removed by screening or sieving.

A slurry for a negative electrode was prepared by mixing 9 g (90 wt %) of the synthesized lithium titanium oxide, 0.4 g (4 wt %) of carbon black as a conductive agent, and 0.6 g (6 wt %) of PVdF as a binder. Then, an about 10 μm thick aluminum thin film was coated with the slurry and dried to prepare a negative electrode, and the negative electrode was then roll-pressed.

2) Preparation of Lithium Secondary Battery

A slurry for a positive electrode was prepared by adding lithium cobalt oxide (LiCoO$_2$) as a positive electrode active material, carbon black as a conductive agent, and polyvinylidene fluoride (PVdF) as a binder to N-methyl-2-pyrrolidone (NMP) as a solvent. An about 20 μm thick aluminum thin film, as a positive electrode collector, was coated with the slurry for a positive electrode and dried to prepare a positive electrode, and the positive electrode was then roll-pressed.

An electrolyte solution was prepared by dissolving 1 M LiPF$_6$, as a lithium salt, in a non-aqueous solvent in which ethylene carbonate (EC) and diethyl carbonate (DEC) were mixed, a separator formed of three layers of polypropylene/polyethylene/polypropylene (PP/PE/PP) was prepared, and the positive electrode, the negative electrode, and the separator were assembled and the electrolyte solution was injected to prepare a lithium secondary battery.

Example 2

A lithium secondary battery was prepared in the same manner as in Example 1 except that sintering was performed by setting the sintering temperature to 785° C. during the preparation of the lithium titanium oxide.

Example 3

A lithium secondary battery was prepared in the same manner as in Example 1 except that sintering was performed by setting the sintering temperature to 800° C. during the preparation of the lithium titanium oxide.

Example 4

A lithium secondary battery was prepared in the same manner as in Example 1 except that sintering was performed by setting the sintering temperature to 825° C. during the preparation of the lithium titanium oxide.

Example 5

A lithium secondary battery was prepared in the same manner as in Example 1 except that sintering was performed by setting the sintering temperature to 835° C. during the preparation of the lithium titanium oxide.

Comparative Example 1

A lithium secondary battery was prepared in the same manner as in Example 1 except that sintering was performed by setting the sintering temperature to 765° C. during the preparation of the lithium titanium oxide.

Experimental Example 1

Performance Evaluation of Lithium Titanium Oxide and Lithium Secondary Battery Including the Same 1) Measurement of Residual Amount of Lithium in Lithium Titanium Oxide A residual amount of lithium was measured for the lithium titanium oxides prepared in Examples 1 to 5 and Comparative Example 1 by using the following pH titration method.

2 g of a sample to be measured was put in a 250 ml beaker, and 100 ml of distilled water was added thereto and stirred for 5 minutes. After the stirring was completed, the supernatant was filtered to remove a solid material and was titrated with 0.1 N HCl using a pH meter, and thus, concentrations of LiOH and $Li_2CO_3$ in the solution were analyzed. The results thereof are presented in the following Table 1 and FIG. 1.

2) Measurement of Amount of Gas Generated During High-Temperature Storage of Lithium Secondary Battery An amount of gas generated during high-temperature storage was measured for the lithium secondary batteries prepared in Examples 1 to 5 and Comparative Example 1, and, as a measurement method, an indirect method was used in which the amount of gas generated was confirmed through a degree of expansion of the battery due to the generation of gas by measuring a thickness of the battery.

That is, after packing the lithium secondary batteries of the examples and comparative example, the lithium secondary batteries in a fully charged state were introduced into a chamber at 90° C. and then stored for 4 hours to measure a degree of thickness expansion of each battery, and the results thereof are presented in the following Table 1 and FIG. 1.

3) Evaluation of Rate Capability of Lithium Secondary Battery

The negative electrode prepared in 1) of Example 1 and lithium metal were used to prepare a half-cell. In order to evaluate rate capability of the half-cell, the half-cell was charged at constant current using a TOYO cycler and the charge was stopped when a voltage reached 1 V. The half-cell was discharged at constant current, the discharge was stopped when the voltage reached 2.5 V, and the charge and discharge were performed at the same C rate. Charge capacity per weight of the negative electrode active material was measured at 10 C and 0.1 C, and results of rate capability (%), which was represented by a ratio of 10 C discharge capacity after 10 C charge to 0.1 C discharge capacity after 0.1 C charge, are presented in Table 1 below.

TABLE 1

| Category | Sintering temperature (° C.) | Li/Ti molar ratio | Residual amount of lithium (ppm) | Degree of thickness expansion (mm) | Rate capability (%) |
|---|---|---|---|---|---|
| Comparative Example 1 | 765 | 0.83 | 2746 | 2.8 | 74.7 |
| Example 1 | 775 | 0.83 | 842 | 0.5 | 81.3 |
| Example 2 | 785 | 0.83 | 801 | 0.4 | 80.2 |
| Example 3 | 800 | 0.83 | 787 | 0.4 | 79.5 |
| Example 4 | 825 | 0.83 | 764 | 0.2 | 69.4 |
| Example 5 | 835 | 0.83 | 601 | 0.2 | 61.1 |

A graph illustrated in FIG. 1 illustrates the results of evaluating the residual amount of lithium, the degree of thickness expansion of the battery, and the rate capability of Examples 1 to 5 and Comparative Example 1.

Referring to Table 1 and FIG. 1, with respect to the residual amount of lithium, it may be confirmed that Examples 1 to 5, in which the sintering temperature was 775° C. or more, exhibited values of 850 ppm or less, but Comparative Example 1, in which the sintering temperature was 765° C., exhibited a high value of about 3.5 times the residual amount of lithium of Example 1.

Also, referring to the results of measuring the degree of thickness expansion of the battery when stored at high temperature, it may be confirmed that the degrees of thickness expansion of Examples 1 to 5, in which the sintering temperature was 775° C. or more, were reduced to about 6 times the degree of thickness expansion of Comparative Example 1 in which the sintering temperature was 765° C.

The above results of the residual amount of lithium and the degree of thickness expansion indicated that, since a possibility of forming a lithium titanium oxide phase may be increased when the sintering temperature was increased and the lithium titanium oxide phase was sufficiently formed in comparison to a case of low sintering temperature to reduce amounts of the lithium precursor and by-product, a material generating gas was almost absent even if stored at high temperature, and accordingly, safety may be secured by removing the risk of battery explosion due to the expansion of the battery.

Simultaneously, with respect to the rate capability of the lithium secondary battery, it may be confirmed that the rate capability of Comparative Example 1, in which the sintering temperature was 765° C., was only about 74%, but the rate capability of Example 1, in which the sintering temperature was 775° C., was greater than 80% and it may be confirmed that a rate capability of about 80% was maintained up to 800° C. However, when the sintering temperature was continuously increased, it may also be confirmed that the rate capability was reduced, and this may be resulted from an increase in the particle size of the synthesized lithium titanium oxide.

That is, in a case in which the temperature was properly controlled during the sintering of the lithium titanium oxide, it may be confirmed that a lithium secondary battery may be provided in which the residual amount of lithium and the amount of gas generated were reduced within a range in which the rate capability of the lithium secondary battery was not significantly reduced.

Example 6

A lithium secondary battery was prepared by synthesizing a lithium titanium oxide and preparing a negative electrode in the same manner as in Example 1 except that a lithium precursor and a titanium precursor were mixed to obtain a molar ratio of lithium to titanium in the lithium titanium oxide after sintering of 0.80.

Example 7

A lithium secondary battery was prepared by synthesizing a lithium titanium oxide and preparing a negative electrode in the same manner as in Example 1 except that a lithium precursor and a titanium precursor were mixed to obtain a molar ratio of lithium to titanium in the lithium titanium oxide after sintering of 0.81.

Example 8

A lithium secondary battery was prepared by synthesizing a lithium titanium oxide and preparing a negative electrode in the same manner as in Example 1 except that a lithium precursor and a titanium precursor were mixed to obtain a molar ratio of lithium to titanium in the lithium titanium oxide after sintering of 0.83.

Example 9

A lithium secondary battery was prepared by synthesizing a lithium titanium oxide and preparing a negative electrode in the same manner as in Example 1 except that a lithium precursor and a titanium precursor were mixed to obtain a molar ratio of lithium to titanium in the lithium titanium oxide after sintering of 0.85.

Comparative Example 2

A lithium secondary battery was prepared by synthesizing a lithium titanium oxide and preparing a negative electrode in the same manner as in Example 1 except that a lithium precursor and a titanium precursor were mixed to obtain a molar ratio of lithium to titanium in the lithium titanium oxide after sintering of 0.87.

Comparative Example 3

A lithium secondary battery was prepared by synthesizing a lithium titanium oxide and preparing a negative electrode in the same manner as in Example 1 except that a lithium precursor and a titanium precursor were mixed to obtain a molar ratio of lithium to titanium in the lithium titanium oxide after sintering of 0.95.

Experimental Example 2

Performance Evaluation of Lithium Titanium Oxide and Lithium Secondary Battery Including the Same A residual amount of lithium and an amount of gas generated during high-temperature storage were measured for Examples 6 to 9 and Comparative Examples 2 and 3 in the same manner as in Experimental Example 1, and discharge capacities were measured. The results thereof are presented in the following Table 2 and FIGS. 2 to 4.

TABLE 2

| Category | Li/Ti molar ratio | Sintering temperature (° C.) | Residual amount of lithium (ppm) | Degree of thickness expansion (mm) | Discharge capacity (mAh/g) |
| --- | --- | --- | --- | --- | --- |
| Example 6 | 0.80 | 775 | 1833 | 1.6 | 160.3 |
| Example 7 | 0.81 | 775 | 1138 | 0.6 | 164.1 |
| Example 8 | 0.83 | 775 | 842 | 0.5 | 167.9 |
| Example 9 | 0.85 | 775 | 1692 | 1.1 | 162.9 |
| Comparative Example 2 | 0.87 | 775 | 2481 | 2.5 | 159.2 |
| Comparative Example 3 | 0.95 | 775 | 4911 | 9.4 | 149.7 |

Figure 2:
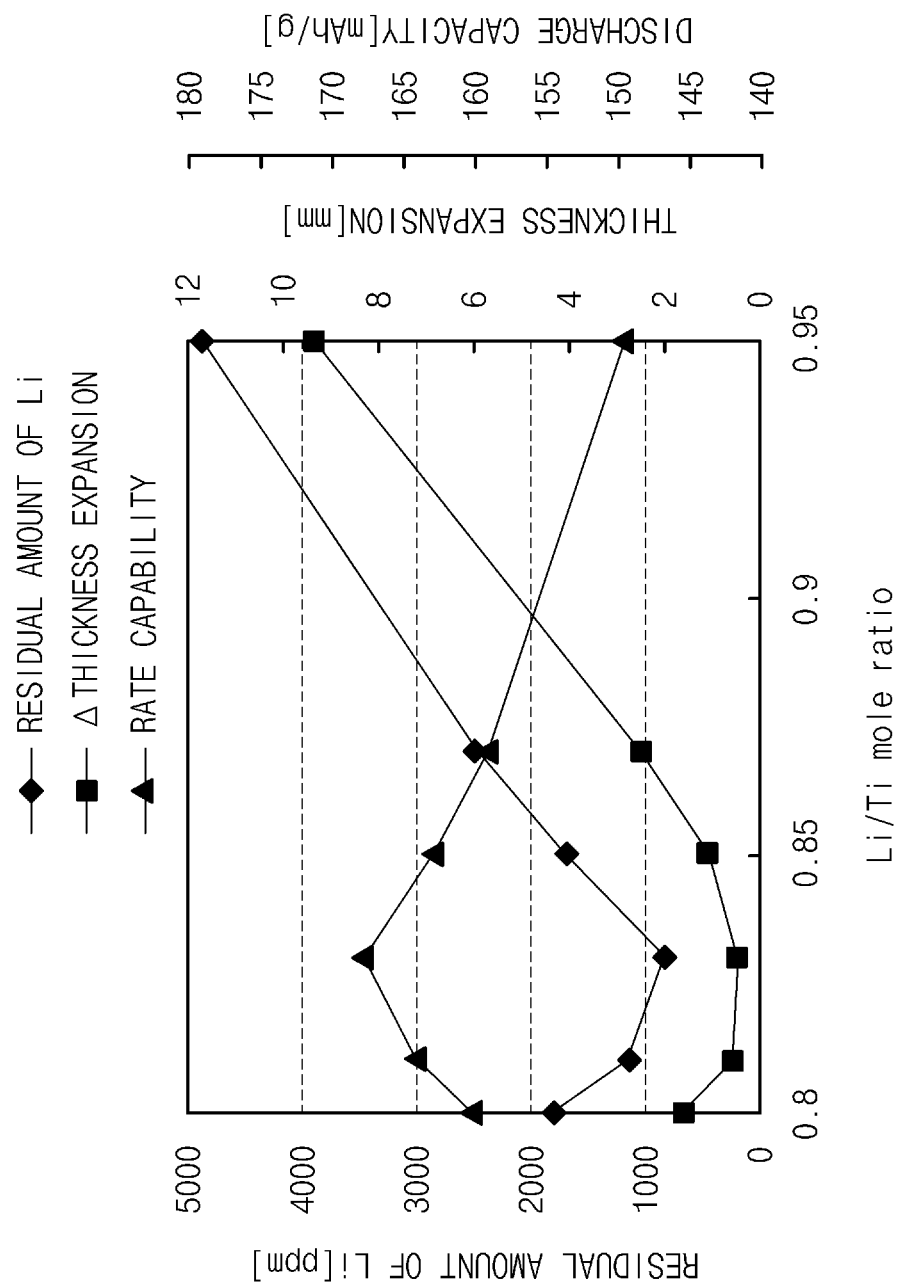
FIG. 2 is a graph illustrating the results in which a residual amount of lithium, thickness variation during high-temperature storage, and discharge capacity of a lithium secondary battery prepared according to an embodiment of the present invention are evaluated according to a molar ratio of lithium to titanium.

A graph illustrated in FIG. 2 illustrates the results of measuring the residual amount of lithium, the degree of thickness expansion of the battery, and the discharge capacity of Examples 6 to 9 and Comparative Examples 2 and 3.

Referring to Table 2 and FIG. 2, with respect to the residual amount of lithium, it may be confirmed that Examples 6 to 9, in which the molar ratios of lithium to titanium were in a range of 0.80 to 0.85, exhibited values of about 2,000 ppm or less, but Comparative Examples 2 and 3, in which the molar ratios of lithium to titanium were 0.87 and 0.95, had a residual amount of lithium of greater than 2,000 ppm, a high value of about 3 to 6 times the smallest residual amount of lithium. Also, referring to the graph of FIG. 2, it may be confirmed that the residual amount of lithium did not exceed 2,000 ppm when the molar ratio of lithium to titanium was up to about 0.86.

Furthermore, according to the results of measuring the degree of thickness expansion of the battery when stored at high temperature, with respect to Examples 6 to 9, the thicknesses of the batteries did not exceed 2 mm, but, with respect to Comparative Examples 2 and 3, the thicknesses exceeded 2 mm and, with respect to Comparative Example 3 in which the molar ratio was 0.95, since the thickness expanded about 9 to 20 times those of the examples, it may be confirmed that the amount of gas generated was significant.

Figure 3A:
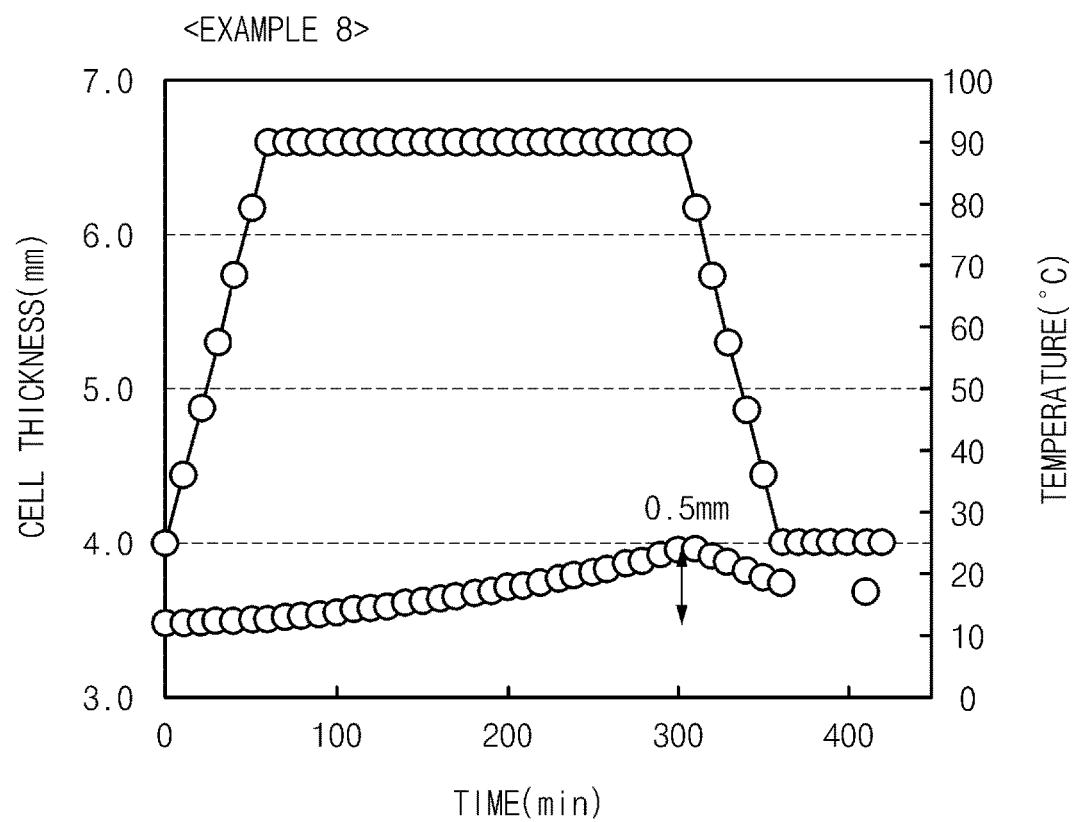
FIG. 3A is a graph illustrating thickness variation during high-temperature storage of a lithium secondary battery prepared according to Example 8.
Figure 3B:
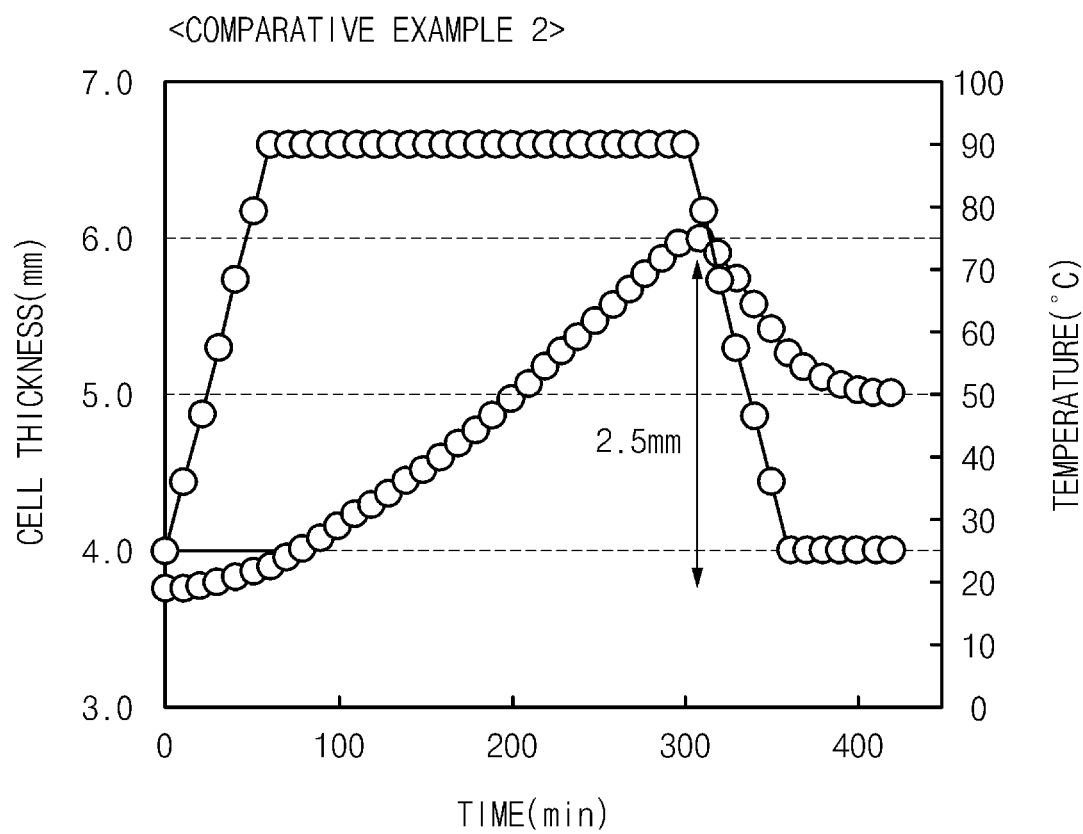
FIG. 3B is a graph illustrating thickness variation during high-temperature storage of a lithium secondary battery prepared according to Comparative Example 2.
Figure 4:
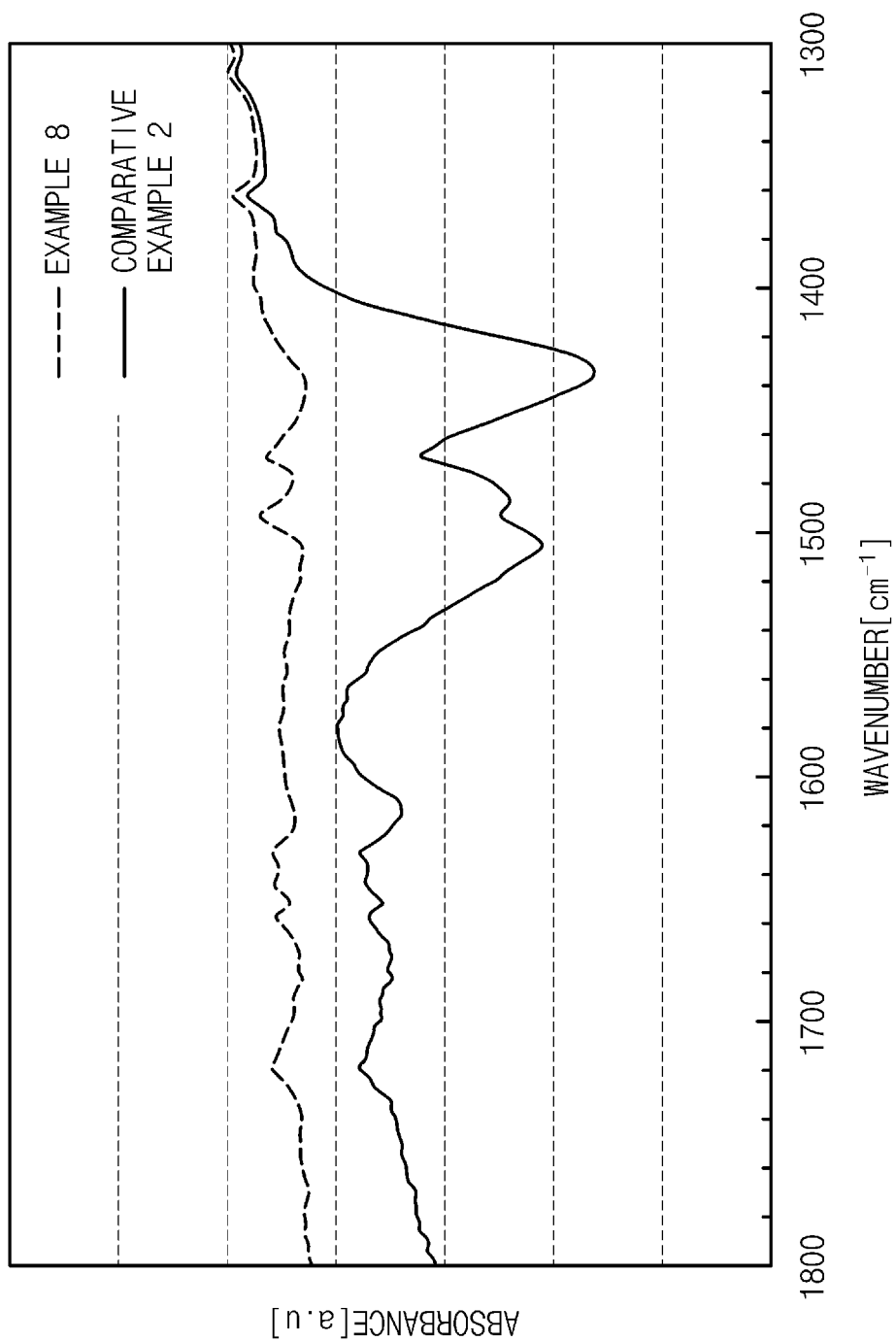
FIG. 4 is a graph illustrating the results of infrared (IR) analysis of lithium titanium oxides prepared according to Example 8 and Comparative Example 2.

FIGS. 3A and 3B are comparison graphs illustrating degrees of thickness expansion for Example 8 and Comparative Example 2 in which a difference in the residual amount of lithium was significant, and FIG. 4 is a graph illustrating the results of infrared (IR) analysis of the lithium titanium oxides of Example 8 and Comparative Example 2.

Referring to FIGS. 3A and 3B, the thickness of the battery of Example 8 was only expanded by about 0.5 mm even if the battery was stored at a high temperature close to 90° C., but the thickness of the battery of Comparative Example 2 was rapidly expanded as the temperature was increased and the high temperature was maintained, and thus, it may be understood that the thickness was expanded by 2.5 mm which is 5 times that of Example 8.

Referring to FIG. 4, when a peak at 1500 cm$^{-1}$, a peak corresponding to $Li_2CO_3$ as a compound associated with the residual amount of lithium in the lithium titanium oxide, was observed, it may be understood that intensity of the peak (lower) of Comparative Example 2, in which the residual amount of lithium was about 2,500 ppm, was higher than intensity of the peak (upper) of Example 8 in which the residual amount of lithium was about 840 ppm, and accordingly, it may be confirmed that the degree of thickness expansion and the residual amount of lithium exhibited a similar behavior.

These results indicated that, since amounts of the unreacted lithium and titanium precursors during the synthesis of the lithium titanium oxide were decreased and, accordingly, the residual amount of lithium was reduced, a material generating gas was almost absent even if stored at high temperature, and, accordingly, safety may be secured by removing the risk of battery explosion due to the expansion of the battery.

Also, the above results also indicated that, since other phases in addition to the lithium titanium oxide phase were formed to rapidly increase the amount of generated gas due to the side reaction and reduce the discharge capacity to 160 mAh/g or less when the molar ratio was not adjusted to an appropriate range, it became a cause of further reducing the discharge capacity.

That is, in a case in which the molar ratio of lithium to titanium in the lithium titanium oxide after the sintering was maintained in a range of about 0.79 to about 0.86, for example, 0.80 to 0.85 by appropriately adjusting the mixed amount of the precursors during the sintering of the lithium titanium oxide, it may be confirmed that a lithium secondary battery may be provided in which the residual amount of lithium and the amount of gas generated were reduced within a range in which the discharge capacity of the lithium secondary battery was not significantly reduced.

Although the exemplary embodiments of the present invention have been described in detail, the scope of the present invention is not limited thereto but various modifications and improvements made by those skilled in the art using the basic concept of the present invention defined in the claims also fall within the scope of the present invention.

The invention claimed is:

1. A method of preparing a negative electrode active material, the method comprising:
   mixing a lithium precursor and a titanium precursor; and
   sintering the precursor mixture to prepare a lithium titanium-based active material including a lithium titanium oxide,
   wherein the sintering is performed in a temperature range of 775° C. to 800° C.; a molar ratio of lithium to titanium in the lithium titanium oxide is in a range of 0.80 to 0.85; and a residual amount of lithium in the lithium titanium-based active material is 2,000 ppm or less based on a total amount of the lithium titanium-based active material.

2. The method of claim 1, wherein the mixing is performed by:
   a wet mixing method in which the lithium precursor and the titanium precursor are mixed with a volatile solvent and dried, or
   a dry mixing method in which the lithium precursor and the titanium precursor are mixed using one device selected from the group consisting of a ball mill, a high-speed rotary grinder, a stirring mill, a jet mill, or a combination thereof.

3. The method of claim 2, wherein the wet mixing method is performed by using a spray dryer, and
   the spray dryer comprises one selected from the group consisting of an ultrasonic spray dryer, an air nozzle spray dryer, an ultrasonic nozzle spray dryer, a filter expansion aerosol generator, an electrostatic spray dryer, or a combination thereof.

4. The method of claim 1, wherein the mixing is performed by mixing 25 wt % to 45 wt % of the lithium precursor and 55 wt % to 75 wt of the titanium precursor.

5. The method of claim 1, wherein the molar ratio of lithium to titanium in the lithium titanium oxide is in a range of 0.81 to 0.85.

6. The method of claim 1, wherein the lithium precursor comprises one selected from the group consisting of $Li_2CO_3$, LiOH, LiF, $Li_2SO_4$, $LiNO_3$, LiCl, and a combination thereof.

7. The method of claim 1, wherein the titanium precursor comprises one selected from the group consisting of $TiO_2$, $TiCl_4$, $TiOCl_2$, $TiOSO_4$, $TiO(OH)_2$, and a combination thereof.

8. A negative electrode slurry for a lithium secondary battery, the negative electrode slurry comprising:
   a lithium titanium-based active material including a lithium titanium oxide;
   a conductive agent; and
   a binder,
   wherein a residual amount of lithium in the lithium titanium oxide is 2,000 ppm or less based on a total amount of the lithium titanium oxide.

9. The negative electrode slurry for a lithium secondary battery of claim 8, further comprising 84 wt % to 92 wt % of the lithium titanium-based active material 2 wt % to 6 wt % of the conductive agent, and 2 wt % to 10 wt % of the binder.

10. The negative electrode slurry for a lithium secondary battery of claim 8, wherein a molar ratio of lithium to titanium in the lithium titanium oxide is in a range of 0.79 to 0.86.

11. The negative electrode slurry for a lithium secondary battery of claim 8, wherein a molar ratio of lithium to titanium in the lithium titanium oxide is in a range of 0.80 to 0.85.

12. The negative electrode slurry for a lithium secondary battery of claim 8, wherein the residual amount of lithium is an amount of a lithium salt in addition to the lithium titanium oxide present in the lithium titanium-based active material.

13. The negative electrode slurry for a lithium secondary battery of claim 8, wherein the conductive agent comprises one selected from the group consisting of artificial graphite, natural graphite, carbon black, acetylene black, Ketjen black, Denka black, thermal black, channel black, carbon fibers, metal fibers, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, and a combination thereof.

14. The negative electrode slurry for a lithium secondary battery of claim 8, wherein the binder comprises one selected from the group consisting of polyvinylidene fluoride (PVdF), a polyvinylidene fluoride-polyhexafluoropropylene copolymer (PVdF/HFP), poly(vinyl acetate), polyvinyl alcohol, polyethylene oxide, polyvinylpyrrolidone, polyvinylpyridine, alkylated polyethylene oxide, polyvinyl ether, poly(methyl methacrylate), poly(ethyl acrylate), polytetrafluoroethylene (PTFE), polyvinyl chloride, polyacrylonitrile, a styrene-butadiene rubber, an acrylonitrile-butadiene rubber, a fluoro rubber, an ethylene-propylene-diene monomer (EPDM), a sulfonated ethylene-propylene-diene monomer, carboxymethyl cellulose (CMC), regenerated cellulose, starch, hydroxypropyl cellulose, tetrafluoroethylene, and a combination thereof.

15. The negative electrode slurry for a lithium secondary battery of claim 8, wherein a diameter of particles of the lithium titanium-based active material is in a range of 0.1 μm to 100 μm.

16. A negative electrode for a lithium secondary battery, the negative electrode comprising:
   a negative electrode collector; and
   the negative electrode slurry for a lithium secondary battery of claim 8 coated on the negative electrode collector.

* * * * *